(12) United States Patent
Sun

(10) Patent No.: US 7,302,231 B2
(45) Date of Patent: Nov. 27, 2007

(54) MIMO COMMUNICATION SYSTEM

(75) Inventor: Yong Sun, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 290 days.

(21) Appl. No.: 10/911,566

(22) Filed: Aug. 5, 2004

(65) Prior Publication Data

US 2005/0107057 A1    May 19, 2005

(30) Foreign Application Priority Data

Oct. 10, 2003    (GB) ................................. 0323834.2

(51) Int. Cl.
*H04B 15/00* (2006.01)

(52) U.S. Cl. ....................... 455/63.1; 455/295; 455/272

(58) Field of Classification Search ................ 455/63.1, 455/295, 272; 375/438
See application file for complete search history.

(56) References Cited

U.S. PATENT DOCUMENTS

| | | | |
|---|---|---|---|
| 5,621,769 A | | 4/1997 | Wan et al. |
| 5,905,946 A | * | 5/1999 | Lilleberg et al. ............ 455/63.1 |
| 6,141,393 A | | 10/2000 | Thomas et al. |
| 6,314,147 B1 | * | 11/2001 | Liang et al. ................. 375/346 |
| 7,106,813 B1 | * | 9/2006 | Ling .......................... 375/343 |
| 2003/0026348 A1 | | 2/2003 | Llang et al. |
| 2003/0043892 A1 | | 3/2003 | Braun |
| 2004/0192215 A1 | * | 9/2004 | Onggosanusi et al. ... 455/67.13 |
| 2004/0198296 A1 | * | 10/2004 | Hui et al. ................... 455/296 |
| 2004/0204103 A1 | * | 10/2004 | Rouphael ................. 455/562.1 |

OTHER PUBLICATIONS

Tuchler,Michael; Singer, Andrew; "Minimum Mean Squared Error Equalization Using A Priori Information", Mar. 2002, IEEE Transactions on Signal Processing, Vol. 50, pp. 673-683.*
Kazunoryi Hayashi, et al., "A New Spatio-Temporal Equalization Method Using Estimated Channel Impulse Response", VTC 2000-Spring, vol. 3 of 3, conf. 51, XP-000968450, May 15, 2000, pp. 2477-2481.
Y. Sun, et al., "Iterative Channel Estimation with MIMO MMSE-Turbo Equalisation", Vehicular Technology Conference, vol. 12, XP-010700977, Oct. 6, 2003, pp. 1278-1282.
Jen-Wei Liang, et al., "A Two-Stage Hybrid Approach for CCI/ISI Reduction with Space-Time Processing", IEEE Communications Letters, vol. 1, No. 6, Nov. 1997, pp. 163-165.

* cited by examiner

*Primary Examiner*—Philip J. Sobutka
(74) *Attorney, Agent, or Firm*—Oblon, Spivak, McClelland, Maier & Neustadt, P.C.

(57) ABSTRACT

The invention provides a generic and comprehensive architecture to optimise several space-time adaptive algorithms and their applications for both CCI and ISI interference cancellation for MIMO systems. The basic idea of this invention is to optimise space-only processes and time-only processes and their combination to take account of the varying affects of CCI and ISI in a given environment. This maximises the efficiency of adaptive algorithms. The invention is targeting on unknown CCI or co-antenna interference of other operating system at the same frequency band.

19 Claims, 6 Drawing Sheets

| Operation-(1) | Known channel and DoAs, 1st iteration; |
| Operation-(2) | Known channel and DoAs, 3rd iteration; |
| Operation-(3) | Estimated channel and DoAs, 1st iteration; |
| Operation-(4) | Estimated channel and DoAs, 3rd iteration; |
| Operation-(5) | Estimated channel and DoAs, 1st iteration; |
| Operation-(6) | Estimated channel and DoAs, 3rd iteration; |

MIMO COMMUNICATION SYSTEM

FIELD OF THE INVENTION

The present invention relates to digital communication systems and in particular to multiple antenna systems using the multiple-input multiple-output (MIMO) system.

BACKGROUND OF THE INVENTION

As the demands on wireless communications continue to increase, the need for ever higher data throughput capacity rises. Various schemes have been proposed to maximise the amount useable bandwidth and to use the available bandwidth as efficiently as possible.

Co-channel interference (CCI) and inter-symbol interference (ISI), which are the two major interference sources in wireless communication, differ from each other in many ways. Two major differences lie in the imbalance of energy and the different characteristics they have in the spatial and temporal domains.

Beamforming is an effective way of excluding interference emanating from a direction other than that of the desired transmitter. This has conventionally been used for narrowband applications, since it is difficult for the beamformer to distinguish between CCI and ISI. However, on the other hand, beamforming can be effective at eliminating strong CCI and ISI interference. The difficulty of beamformers to distinguish between CCI and ISI can reduce the overall efficiency of traditional beamforming applications. By failing to distinguish between these types of interference, any imbalance will adversely affect the performance of the receiver.

Recently, the multiple-input multiple-output (MIMO) system has been investigated. This provides a considerable increase in throughput at relatively small cost in terms of bandwidth. However, the processing overhead for this type of communication technique is significant. In addition, this type of system involves considerable processing overhead in trying to remove inference both from unknown co-channel interference (CCI) from external interferers as well as inter symbol interference (ISI).

When considering unknown interference in a system, adaptive antenna techniques have been proven to be a powerful technique to eliminate the interference efficiently. This kind of interference can be from other systems operating in the same frequency band. However, for a MIMO system, the unknown interference is normally treated as additional noise (coloured-noise) and this will significantly reduce the expected system capacity.

Various techniques have been proposed for dealing with interference. One technique is suggested in a paper by J. W. Liang, et al, entitled "A Two-Stage Hybrid Approach for CCI/ISI Reduction with Space-Time Processing", IEEE Comm. Letters, Vol. 1, No. 6, November 1997. The system described involves a simple two-stage hybrid approach for CCI and ISI reduction. Two completely separated processes are employed to act on CCI and ISI independently and sequentially. However, the obvious weakness of this arrangement is the great dependency on accurate channel estimation. In fact, with CCI, channel estimation cannot be performed accurately with this technique. Furthermore, this technique is described for use in a single input system.

The papers entitled "A Low Complexity Turbo Adaptive Interference Cancellation Using Antenna Arrays for W-CDMA" by D. Mottier, L. Brunel, IEEE VTC2001-fall and "Iterative Interference Cancellation for High Spectral Efficiency Satellite Communications", by B. F. Beidas, et al, IEEE Trans. on Comm., Vol. 50, No. 1, January 2002 propose iterative interference cancellation schemes but for use with single-input single-output systems using CDMA. The interference target is multi-user interference, which is specific to CDMA systems.

No single algorithm can employ to operate efficiently on both CCI and ISI. For example, MLSE-type algorithms can effectively equalise ISI but are susceptible to CCI.

The present invention therefore aims to provide a solution to the problems of cancelling ISI and CCI effectively. In particular, the present invention aims to provide an iterative beamforming approach for use in a MIMO system to eliminate unknown interference, which is the interference from other systems which are being operated at the same frequency band.

SUMMARY OF THE INVENTION

Therefore according to the present invention there is provided a method of obtaining an estimate of a transmission channel to a receiver, the method comprising:

a) receiving input signals from a plurality of receive antennas, said input signals being based upon a predetermined training sequence which has been transmitted to said receiver;

b) determining a first estimate of said transmission channel, based upon said input signals and said predetermined training sequence;

c) carrying out co-channel interference cancellation on said input signals using said first transmission channel estimate, to provide an intermediate signal;

d) determining a second estimate of said transmission channel based upon said intermediate signal and said predetermined training sequence;

e) carrying out inter-symbol interference cancellation on said intermediate signal using said second transmission channel estimate, to provide an output signal; and f) carrying out the following steps one or more times:

i) revising said first transmission channel estimate based upon said input signals, said predetermined training sequence and said second channel estimate;

ii) carrying out co-channel interference cancellation on said input signals using said revised first transmission channel estimate, to provide a revised intermediate signal;

iii) revising said second transmission channel estimate based upon said revised intermediate signal, said predetermined training sequence and said second channel estimate; and iv) carrying out inter-symbol interference cancellation on said revised intermediate signal using said revised second transmission channel estimate, to provide a revised output signal.

The present invention further provides a receiver for optimising an estimate of a transmission channel over which signals based upon a predetermined training sequence are being transmitted to said receiver, the receiver comprising:

a training sequence generator for generating a training sequence;

a plurality of antennas for producing input signals based upon said signals transmitted to said receiver;

first transmission channel estimator for generating a first transmission channel estimate based upon said input signals and said predetermined training sequence;

co-channel interference canceller for cancelling co-channel interference in said input signals and using said first transmission channel estimate, to provide an intermediate signal;

second transmission channel estimator for generating a second transmission channel estimate based upon said intermediate signal and said predetermined training sequence and further adapted for selectively generating a revised second transmission channel estimate based upon said intermediate signal, said predetermined training sequence and a previously calculated second transmission channel estimate; and inter-symbol interference canceller for cancelling inter-symbol interference in said intermediate signal using said second transmission channel estimate, to provide an output signal, wherein said second transmission channel estimator is adapted to feed back said second transmission channel estimate to said first transmission channel estimator; and said first transmission channel estimator is adapted to selectively use said second transmission channel estimate along with said input signals and said predetermined training sequence for generating a revised first transmission channel estimate.

The architecture of this scheme contains two space-time filters, which can be operated sequentially. The primary purpose of the first filter is CCI cancellation whereas the primary purpose of the other filter is ISI cancellation. This separation of processing the ISI and CCI whilst operating an integrated channel estimation scheme provides considerable improvements over the prior art systems. Each filter can be optimised to the removal of the specific type of interference.

By providing a filter for CCI and applying that to the signal before estimating the channel and applying ISI filtering, the estimate and ISI filtering is considerably improved due to the removal of CCI interference.

The present invention preferably also uses a known interference of inter-system interference cancellation stage prior to the CCI cancellation. Removal of the known interference farther enhances the performance of the CCI and ISI filters which follow.

The CCI filter is preferably a beamformer which operates on the received signals from the antenna. The beamformer is preferably referred to each transmit antenna. The beamformer operates by applying weights selectively to the received signals. The weights are preferably generated by a weight determiner which bases the weight values on a comparison of the signals output from the beamformer and a reference signal derived from the training sequence and a channel estimate.

The output from the ISI cancellation stage is preferably deinterleaved and decoded to provide a reference data estimate. This estimate is preferably deinterleaved and used as a feedback signal to the ISI filter, the second channel estimator and the inter-system canceller.

The proposed invention aims to provide a generic and comprehensive architecture to optimise several space-time adaptive algorithms and their application to both CCI and ISI interference cancellation for MIMO systems. This approach is not limited to specific MIMO systems and is intended for use with any kind of generic system. The basic idea of this invention is to optimise the space-only process and time-only process and their combination because it has been established that differences between the levels of CCI and ISI interference and their characteristics requires different efficiencies of adaptive algorithms. Also, the proposed application is one which targets unknown CCI, co-antenna interference (CAI) and frequency selective fading, e.g. ISI.

The first-stage interference cancellation is targeted on unknown co-channel interference by forming beams to each transmit antenna (e.g. for a 2×2 MIMO, 2 beam patterns are formed). Therefore, the 'known' interference from other transmit antennas in the MIMO system should be cancelled and the desired multipath signal should be generated. Ideally, the co-channel interference would be cancelled at this stage leaving all inter-symbol interference to the second-stage ISI cancellation and MIMO detection.

The present invention can be implemented either in hardware or on software in a computer. Further, the present invention can be implemented in a combination of hardware and software. The present invention can also be implemented by a single processing apparatus or a distributed network of processing apparatuses. Since the present invention can be implemented by software, the present invention encompasses computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

BRIEF DESCRIPTION OF THE DRAWINGS

A specific embodiment of the present invention will now be described by way of example only, in which.

DETAILED DESCRIPTION

Figure 1:
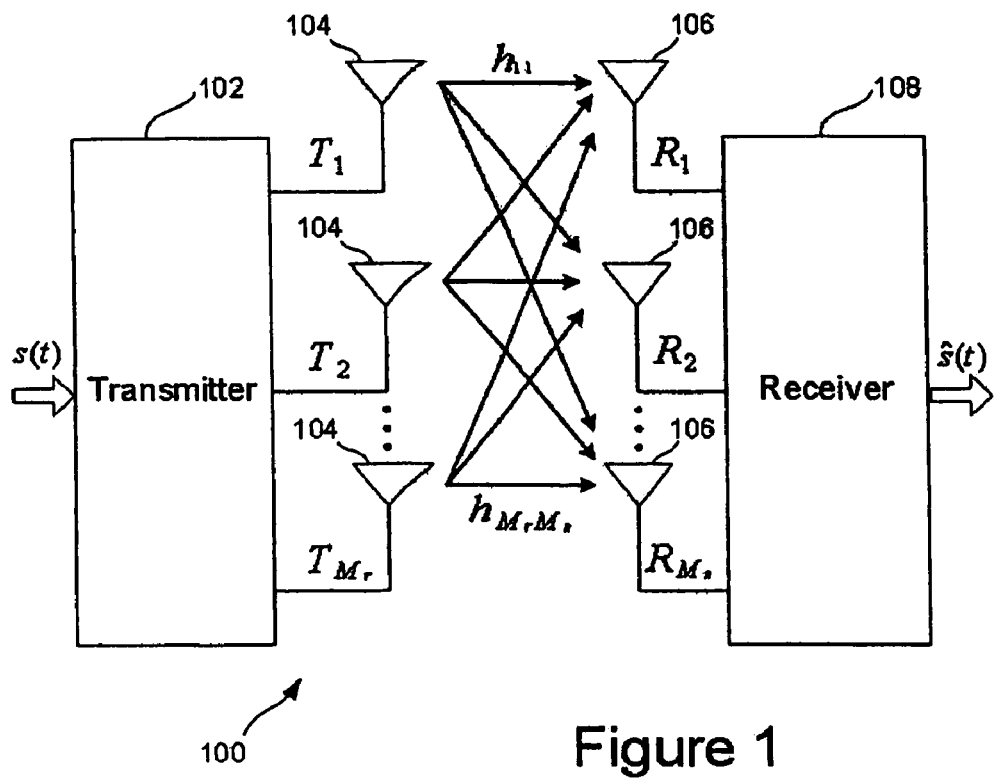
FIG. 1 shows an example of a basic MIMO arrangement.

FIG. 1 shows the basic layout of a MIMO system 100. A data signal s(t) is passed to a transmitter 102 for encoding and splitting into separate streams corresponding to each of a plurality $M_T$ of transmission antennas 104. The signal from each antenna is then broadcast and received by the plurality $M_R$ of receive antennas 106 at the receiver. The path between each transmit antenna 104 and each receive antenna 106 can be modelled by a transfer function h and the overall channel transfer function of the system can be formed from the combination each of these transfer functions to define a function of matrix H. At the receiver 108, the signals from each antenna are extracted and the receiver applies the inverse $H^{-1}$ of the channel transfer function to the received signals to extract the original transmission signals.

In order to apply the function $H^{-1}$, the receiver must first determine the channel transfer function H or an estimate of it. This is normally done by having the transmitter send a training signal which is known at the receiver. In this way, the receiver can generate an estimate of H.

Whilst the MIMO system inherently relies upon a rich scattering channel, which means it is susceptible to detecting signals in the same frequency band from other transmitters operating in the range of the receiver. This results in CCI which will degrade the overall ability to recover the desired signal. In order to reduce this, beamforming may be applied at the receiver to provide a degree of special selectivity at the receiver. In this way, the receiver can select those signals received by the antenna which are from the desired transmitter and attenuate those from undesired sources. The combination of these techniques provides a system which is able to extract both CCI and ISI from the received signal.

Figure 2:
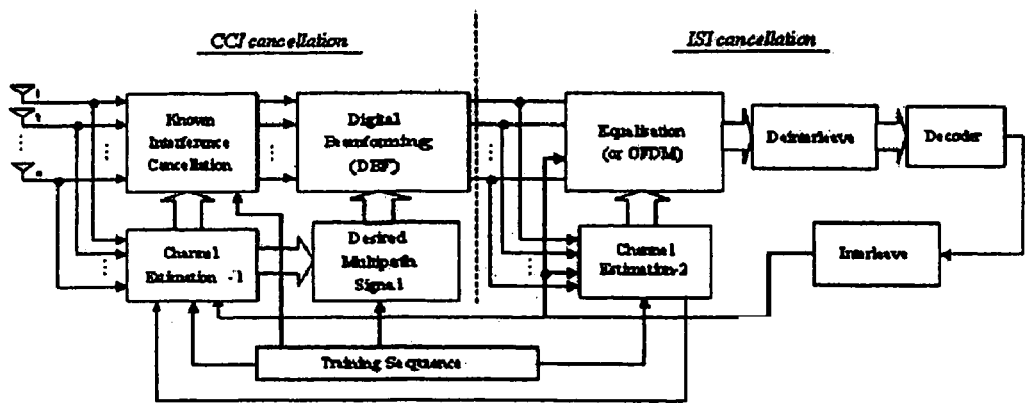
FIG. 2 shows a block diagram of the receiver of the present invention.

An overview of an embodiment of the present invention is shown in FIG. 2. An array of receive antennas is provided for receiving the signals transmitted over the MIMO channel. Of course these received signals will include undesired interference as well as noise. The arrangement shown in FIG. 2 includes two stages for minimising the interference inherent in the received signal.

The received signals are passed from the antennas to a 'Known Interference Cancellation' block for removing known interference from the received signals based upon the initial channel estimation provided by the first channel estimator (CE1). The known interference is the transmitted signals from other transmit antennas convolved with their multipath channels.

Once the known interference cancellation has been carried out, the processed signals are passed through a digital beamformer. The beamformer is set up based upon the initial channel estimate which is used to establish the desired multipath signals. Based upon this, the weights to be applied to the beamformer can be estimated and applied to the beamformer for processing the received signal.

The first channel estimator (CE-1) produces its initial channel estimate based upon the signal initially received by the antennas and the locally generated training sequence. This same training sequence was used at the transmitter to generate the received signal. In this way, the channel estimator can make an initial estimate of the channel. Direction of Arrival (DoA) can also be estimated to help the accuracy of the beamforming process although directly determining the angle of arrival is not essential. A prior knowledge of the DoA can be used to provide a more accurate initial estimate of the weightings for the beamformer which can help to optimise the channel estimates more quickly. It is unlikely that the DoA would be known in advance but a pre-estimation step could be carried out to determine the DoA prior to the initial channel estimation.

Once the received signals have been beamformed, the signal should have a much reduced level of CCI because the CCI cancellation is optimised for CCI cancellation. The signal is now passed to the ISI cancellation stage. The second channel estimator (CE-2) uses the beamformed signal to establish a channel estimate. The removal of the CCI from the signal allows for a much more accurate channel estimate to be determined. This channel estimate is then applied to the equaliser for cancelling ISI interference. The signal is then processed in the normal way to extract the data signals from the MIMO encoded signal.

This process results in an output data estimate, i.e. an estimate of the data fed to the MIMO encoder at the transmitter. If all interference was removed and the channel estimates were good then the received data estimate would correspond to the training sequence. Any errors in the data estimate can be used to modify the channel estimation process. Consequently, the data estimate is fed back via the interleaver to the second channel estimation unit and also the equalisation stage. The channel estimate generated by the second channel estimation unit is sent back to the first channel estimation unit either directly or after having been combined with the data estimate to provide multipath data.

The above process is then repeated iteratively to optimise the channel estimates. The channel estimation carried out by the first channel estimation unit (CE-1), is repeated. The previous estimate was based solely upon the received antenna signals. However, more information is now available from the result of the second channel estimation. This allows the estimate to be refined to try to further reduce the CCI interference in the received signal. Similarly, the second channel estimation step (CE-2) can be improved upon by making use of its previous estimate and the data estimate from the first iteration. This process can be repeated iteratively until the channel estimates by CE-1 and CE-2 are close to their optimum for the level of CCI and ISI interference present in the received signals.

The above explanation describes the overall operation of an embodiment of the present invention. A more detailed description of the architecture of an embodiment of a MIMO receiver according to the present invention will now be described with reference to FIG. 3.

The receiver comprises a plurality of receive antennas $301_1$-$301_n$ for receiving the transmitted signals. The signals received by these antennas are passed to a beamformer via the soft or known interference cancellation unit 305. The interference cancellation unit 305 attempts to cancel interference which is derivable from the channel estimate and training sequence (or detected desired signal), i.e. the known interference, as opposed to interfering signals from external sources which are unknown. By removing the known interference from the received signal, an improved channel estimate can be established. Removal of the known interference followed by beamforming helps to remove much of the CCI leaving the second stage filter to be optimised for ISI removal.

The interference cancellation block 305 is for cancellation of 'known' interference from other antenna arrays to the desired antenna array. Initially, the cancellation scheme can be operated by using the training sequence and an initial channel estimate obtained by the first channel estimation engine. Then, using iterative processing, the interference cancellation can be updated by applying the soft data estimate information and the updated estimated channel.

The beamformer unit 340 comprises a plurality of adaptive beamformers $302_1$-$302_n$ corresponding to each antenna. Each beamformer 302 includes weighting units provided with weight signals from an adaptive beamforming weights updating unit 304. The weights are applied to the signals received from the antennas to provide outputs relating to specific transmitted signals. These are then summed in summation units $303_1$-$303_n$ with components of the same transmitted signal received via other antennas. The outputs from the summation units $303_1$-$303_n$ represent the estimates of the signals transmitted by the transmit antennas. These are then passed to an inter-symbol interference (ISI) cancellation stage 320.

The weightings used in the beamformers $302_1$-$302_n$ are adaptively adjustable and are controlled by the adaptive beamforming weight controller 304. The weight controller 304 adjusts the weightings applied to each branch within the beamformers based upon the estimate established in the co-channel interference (CCI) cancellation unit 330.

The ISI cancellation stage 320 receives the signals from the beamformer into a MIMO filtering unit 309 to extract to carry out ISI cancellation. The signal is also processed to carry out MIMO detection. The output is then passed on for subsequent deinterleaving and decoding to obtain an estimate of the original data stream. This is carried out in the deinterleaver 311 and decoder 312 respectively. The output from the decoder provides the estimate of the originally transmitted training data sequence.

The CCI cancellation unit 330 receives inputs directly from each of the antennas $301_1$-$301_n$. The received input signals received by the antennas are passed to a soft interference cancellation unit 305 but also to a first channel estimation engine 306. The first channel estimation engine 306 is provided for estimating the transfer properties of the transmission channel. The resulting estimate is then used to determine the desired multipath signals at the antennas for adjusting the beamformers to maximise CCI cancellation. As indicated above, although it may not be essential to directly calculate the direction-of-arrival of the signals to the antennas, doing so will help to obtain a more accurate estimate of the parameters for controlling the beamformers.

The first channel estimation engine 306 produces its estimate of the communication channel which is passed to the format unit 307. This unit uses the estimated channel along with the training sequence data to provide an estimate of the desired antenna multipath signal, i.e. the desired signal at the receive antennas. If the channel estimate was perfect, then the output from the beamformers would match the estimate from the format unit 307. Otherwise, any difference would represent an error and it is this error which needs to be minimised by optimisation of the channel estimate and the beamforming. The channel estimate produced by the first channel estimation engine 306 is also passed back to the soft interference cancellation unit 305 to assist in the cancellation of the known interferer component of the received signals.

The format unit 307 provides the multipath signals to the beamformer unit 340 for comparison with the transmit signal estimates produced by the summation units $303_1$-$303_n$. The desired multipath reference signals are subtracted from the transmit signal estimates to provide error signals which are used to control the adaptive beamforming weight controller 304. Based upon these error signals, the weights applied to the beamformers are revised.

Figure 7:
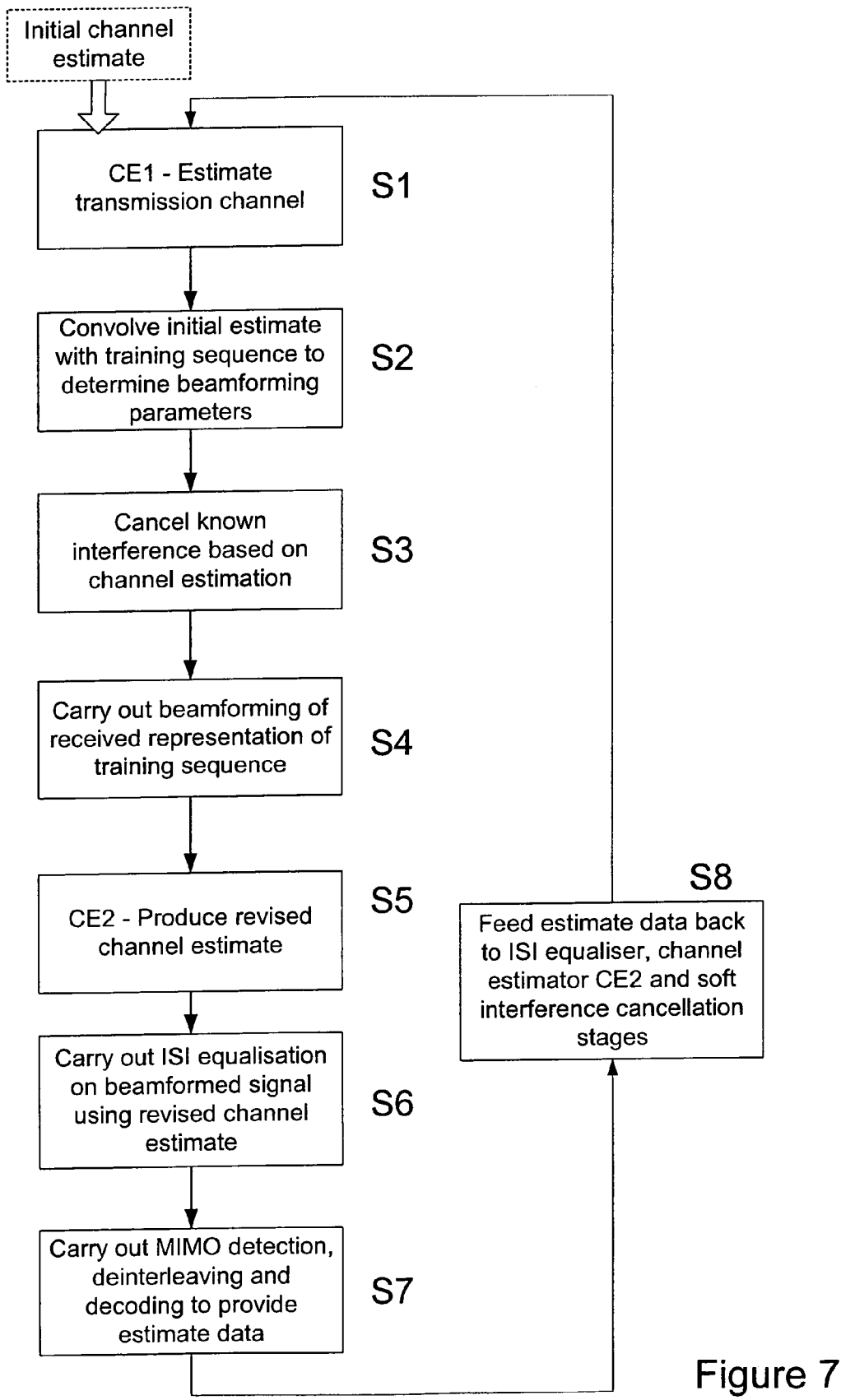
FIG. 7 shows a block diagram of the operation of a receiver of the present invention.

The operation of the system will now be described in more detail, again with reference to FIG. 3 and also the flow diagram of FIG. 7. At step S1, the system operates by forming an initial estimate of the channel in the first channel estimation engine 306 and subsequently in the second channel estimation engine 310. These channel estimates are then used in subsequent iterations to improve the initial channel estimates in order to arrive at an optimum solution within the bounds of coherency time of the channel and processing overhead. Typically 5 or 6 iterations are carried out to arrive at an optimum solution.

In order to establish the channel estimates, a known training signal or sequence is transmitted over the MIMO channel and this is compared to a locally generated training signal produced by a training sequence generator 308.

For the initial iteration (iteration 0), at step S1, the first channel estimation engine 306 attempts to produce an estimate of the channel over which the desired signal travels with a relatively high level of co-channel interference (CCI). At this stage, soft interference cancellation and beamforming of the received signals has not been performed and so no indication of the transmission data is available for reference. The signal is passed directly to the channel estimation unit 306. As a consequence, the initial estimate is based upon the received signal assuming that all the received desired signal power, including all the multipath for the desired signal (ignoring the ISI interference at this stage), is part of the desired signal. This estimation is carried out by consideration of having CCI.

At step S2, the format unit 307 convolves the initial channel estimate data and the training sequence to provide an estimate of the desired multipath signal. This is passed to the beamformer unit 340 where it is used by the adaptive beamforming weights updating unit 304 to provide a set of weighting criteria to apply to the beamformers 302.

At step S3, the received signal from the antennas is passed through the soft interference cancellation unit 305 (also known as inter-system interference or co-antenna interference) to the beamformer unit 340. Then, at step S4, beamforming is carried out on the received signal to provide a first estimate of the desired signal. This signal, which should have considerably reduced CCI, is then passed on to the ISI cancellation unit 320 for ISI cancellation. In the beamformer, any errors between this first estimate and the desired multipath signals from the format unit 307 are used to modify the weightings applied to the beamformer to further optimise the beamformer. The adaptive beamforming weights updating unit 304 bases its estimate upon this error data but also on filtering data extracted from the time delayed data from the sequential delay units D in the beamformer unit 340, as represented by the large arrow marked filtering data in FIG. 3.

At step S5, the output MIMO signal from the beamformer unit is passed to the ISI cancellation unit 320 so that the second channel estimation engine 310 can perform its channel estimation. The second channel estimation engine 310 produces an estimate of the channel. As this estimate is based upon the signal received from the antennas but with a significant portion of the CCI removed, a more accurate estimate than that produced by the first channel estimation engine 306 can be expected.

At step S6, the newly estimated channel is used by the ISI cancellation unit 320 to perform ISI cancellation in the MIMO equalisation filter 309. Once ISI equalisation has been performed, MIMO detection is carried out, at step S7, to extract the initial serial data stream. This can then be passed to the deinterleaver 311 and decoder 312. The output from the decoder provides the estimate of the original source data. At step S8, the estimated source data is then re-interleaved at 313 to provide a feedback to the MIMO equalisation filter 309, the second channel estimation engine 310 and the soft interference cancellation unit 305.

The newly estimated channel produced by the second channel estimation unit 310 can be fed back to the first channel estimation unit 306 for use in enhancing the efficiency of the beamforming.

This above steps can then be repeated a number of times to progressively iterate to a more accurate estimate of the channel. Subsequent iterations would be carried out as above, with the channel estimate from the second channel estimation unit 310 being used as the basis for the next channel estimation in the first channel estimation unit 306. The data estimate produced at the output of the ISI cancellation unit 320 is passed via the interleaver 313 to the soft interference cancellation unit 305 to provide a better estimate of the soft interferers along with the channel information.

The new estimate from the first channel estimation unit 306 is used to revise the beamformer weights to further improve the CCI removal. The further improved estimate signal is passed back to the ISI cancellation unit 320. The second channel estimation unit 310 then revises its previous channel estimate and ISI cancellation is repeated. This again should result in a data estimate output which is more accurate than before.

After a number of iterations, the channel estimate is moved closer to the actual channel conditions to provide improved ISI and CCI removal once actual data is received. Because each of the filtering units operates on their own type of interference and optimises the channel estimates based upon that only, each does its job more effectively as opposed to trying to improve both ISI and CCI performance in a single process.

Once a certain number of iterations have been completed, the estimates will be approaching the optimum achievable within the constraints of the coherence time of the channel and the processing overhead and also the transmission time of the training sequence. At this stage, the estimates are fixed and information data can be processed from the transmitter. The information containing signals received by the antennas are passed through the system in a similar manner with soft cancellation followed by beamforming being performed. Subsequently, ISI cancellation is carried out and the resultant data should now correspond to the transmitted information data.

Whilst the determined channel estimates and beamformer weightings may be fixed during information data transfer, the system may continue to optimise the channel estimates to ensure that estimates are as close to optimum as possible and remain so, particularly if the channel parameters are variable.

Figure 3:
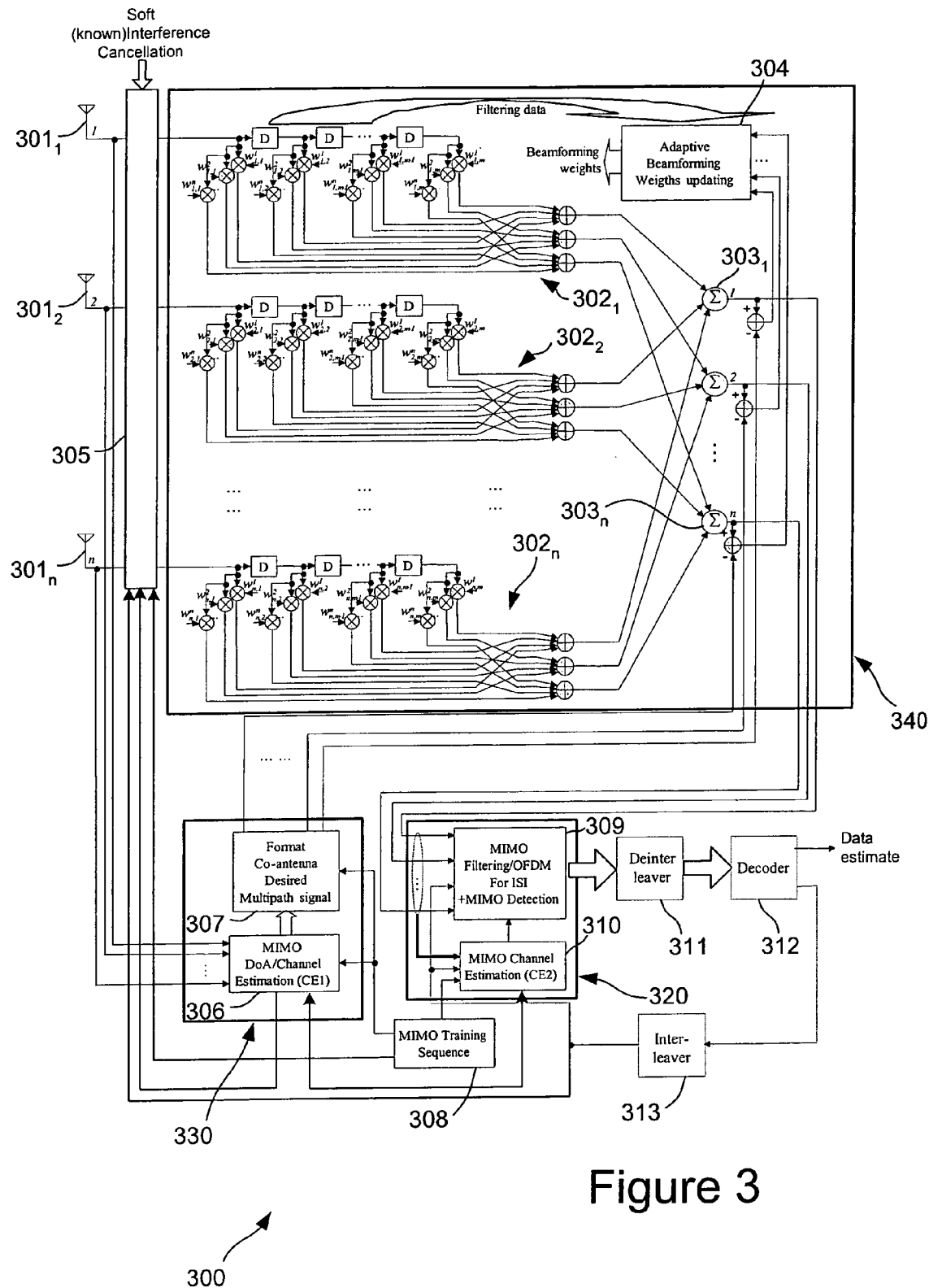
FIG. 3 shows the arrangement of a generic receiver according to the present invention.
Figure 4:
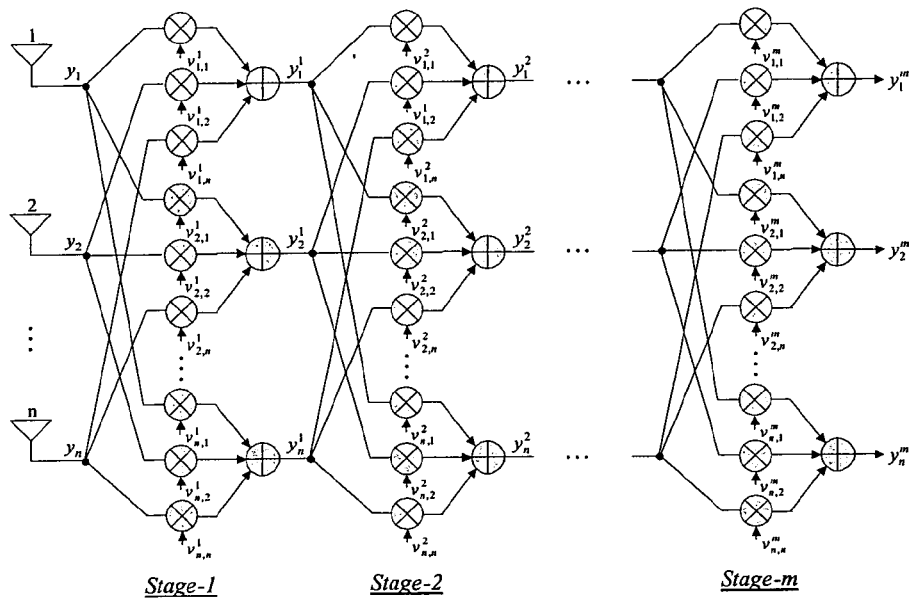
FIG. 4 shows an example of the multi-stage beamforming of the present invention.

The operation of the beamformer is described further below with reference to FIG. 4. FIG. 4 shows schematically the m iteration stages of the beamformer units 302. The weighting values are identified by the reference v to distinguish them from the weights used in FIG. 3. Although they represent the same weights, the notation is slightly different:

$$V_{antenna\_ref,weight\_unit\_ref}^{Stage\_no}$$

For each stage, the previous beam-pattern is held and new sets of beam-weights are applied. FIG. 4 demonstrates that different weights are applied in each iteration by holding the weights of previous stage. It should be noted that FIG. 4 only shows one set of the weights shown in FIG. 3.

Figure 6:
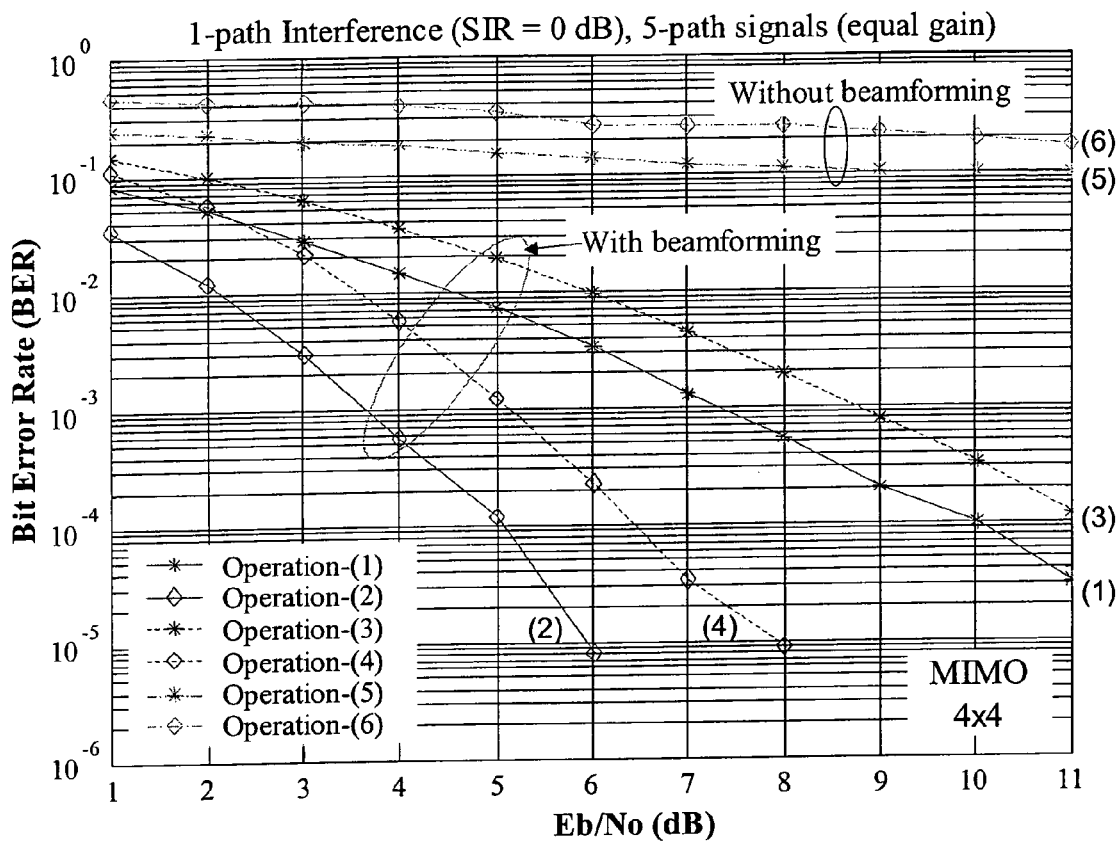
FIG. 6 shows a graph of the performance of arrangements of the present invention.

FIG. 6 shows the result of a simulation of various arrangements of the present invention to demonstrate the improvement proved by the invention. Operations (1) and (2) show the system used with 1 and 3 iterations based upon a prior knowledge of the channel and DoA. Operations (3) and (4) similarly show the results of carrying out 1 and 3 iterations but based upon no prior knowledge of the channel and thus estimating them. Finally, operation (5) and (6) shows the effect of removing the beamforming functionality and repeating operations (3) and (4). As can be seen, the beamforming forms an important part of the filtering process with very poor performance without it. However, with beamforming, the estimation process provides very good results without previous knowledge of the channel and DoA when compared to having such previous knowledge.

Figure 5:
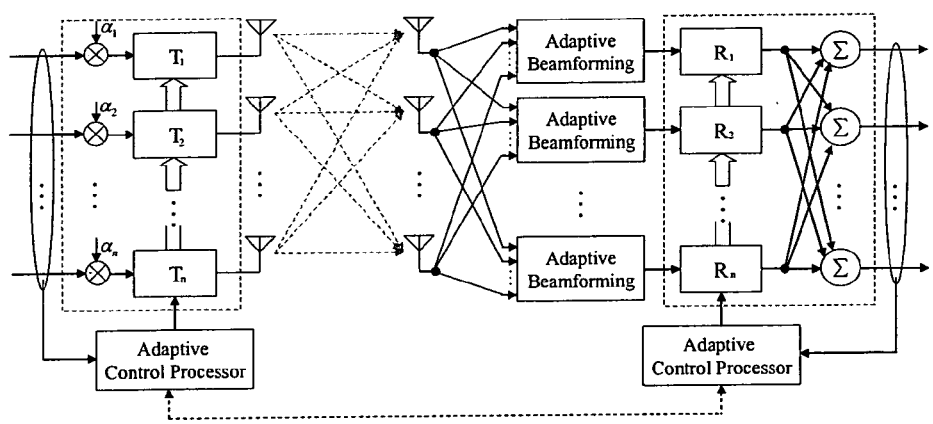
FIG. 5 shows a modified version of the present invention comprising optimisation at the transmitter.

In the above described embodiment, all adaptation is carried out at the receiver and the transmitter does not need to have any knowledge of the channel. However, the above embodiment of the invention may be further improved by providing pre- and post-filtering based upon the final channel estimate. FIG. 5 shows a modified system in which adaptive beamforming is carried out at the transmitter as well as the receiver. This arrangement is similar to known transmitter/receiver adaptive optimisation techniques but includes the additional feature of adaptive beamforming.

The symbol α in FIG. 5 represents a multiplication factor. The symbols T and R represent the processing of the signals at the transmitter and receiver, respectively.

The MIMO detection in the unit 309 can be any known MIMO detection technology. In FIG. 3, the channel estimated by the second channel estimation engine 310 is shown as being fed to the MIMO detection unit 309 since some units need channel information as well for proper detection. Of course, this is not necessary where the MIMO unit does not require this information.

The adaptive beamforming weights updating can be any available adaptive filtering/beamforming algorithms, such as Least Mean Squares (LMS), Normalized Least Mean Squares (NLMS), Recursive Least Squares (RLS), etc.

The second channel estimation engine (CE2) can be iteratively estimated combined with the procedure of filtering/Orthogonal Frequency Division Multiplexing (OFDM) for ISI. This estimated channel can be fed back to both filters.

The filter for ISI cancellation can be a Viterbi equaliser, Turbo equaliser or even a simple Linear Minimum Mean Squared Error (LMMSE) equaliser. Also, it can be a multicarrier (OFDM format) receiver to simplify the equalisation procedure.

For OFDM format "ISI cancellation" or, say, OFDM system, the MIMO beamforming can be also operated after the Fast Fourier Transform (FFT) for each subcarrier or by grouping subcarriers (subcarrier clustering). Subcarrier clustering can be applied when subcarriers within a certain bandwidth experience similar frequency selective fading, and therefore the same antenna weights can be applied for all subcarriers in the cluster.

The receiver front-end will generally be implemented in hardware whilst the receiver processing will usually be implemented at least partially in software although one or more Application Specific Integrated Circuit (ASICs) and/or Field Programmable Gate Arrays (FPGAs) may also be employed. The skilled person will recognize that all the functions of the receiver could be performed in hardware and that the exact point at which the signal is digitized in a software radio will generally depend upon a cost/complexity/power consumption trade-off.

Figure 8:
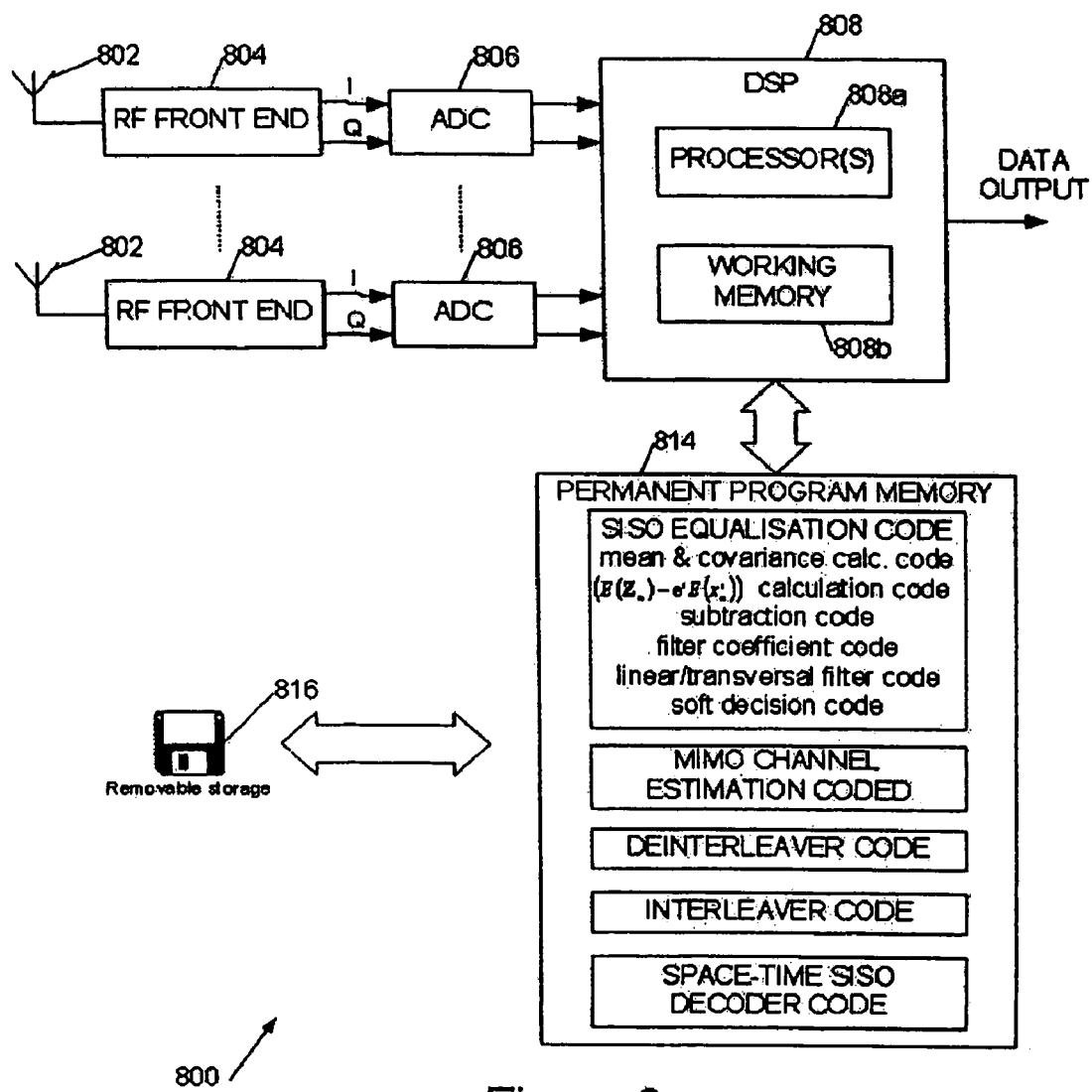
FIG. 8 shows a generic receiver suitable for a practical implementation of the present invention.

FIG. 8 shows a typical practical implementation 800 for an embodiment of the present invention. The receiver may comprise antennas 802, which pass the received analog Radio Frequency (RF) signal to an RF front end 804. At this stage, the output may be converted from quadrature signals to digital signals in an analog to digital converter ADC 806. The digital signals can then be passed to digital signal processors (or ASICs, FPGAs etc.) 808 for processing data 808a and for intermediate storage 808b of data and processing parameters.

Programming code may be provided from a permanent storage means 816 for transfer to a program memory 814 for subsequent transfer to the DSP etc. Equally code may be loaded form other storage means or downloaded directly The the equation $E(Z_n)-e^1(x_n^1)$ in FIG. 8 represents the desired multipath reference signals subtracted from the transmit signal estimates to provide error signals which are used to control an adaptive beamforming weight controller. Additionally, SISO stands for soft input/soft output.

Applications of the invention have been mainly described in the context of a MIMO system with time domain coding but embodiments of the invention are also useful in frequency domain coded systems such as MIMO-OFDM (Orthogonal Frequency Division Multiplexed) systems. For example the invention may be employed with the European Hiperlan/2 or US IEEE 802.11a standards for 54 Mbps wireless networks. The system can similarly be applied to both single carrier and multiple carrier systems. For multi-carrier systems, the equaliser for ISI cancellation 309 would be replaced by a FFT engine (OFDM demodulator). In other words, this type of iterative decoding can also be applied in the frequency domain.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of obtaining an estimate of a transmission channel at a receiver, the method comprising:
   a) receiving input signals from a plurality of receive antennas, said input signals being based upon a predetermined training sequence which has been transmitted to said receiver;
   b) determining a first estimate of said transmission channel, based upon said input signals and said predetermined training sequence;
   c) carrying out co-channel interference cancellation on said input signals using said first transmission channel estimate to provide an intermediate signal;
   d) determining a second estimate of said transmission channel based upon said intermediate signal and said predetermined training sequence;
   e) carrying out inter-symbol interference cancellation on said intermediate signal using said second transmission channel estimate to provide an output signal; and
   f) producing a revised output signal by:
      i) revising said first transmission channel estimate based upon said input signals, said predetermined training sequence and said second channel estimate to provide a revised first transmission channel estimate;
      ii) carrying out co-channel interference cancellation on said input signals using said revised first transmission channel estimate to provide a revised intermediate signal;
      iii) revising said second transmission channel estimate based upon said revised intermediate signal, said predetermined training sequence and said second channel estimate to provide a revised second channel estimate; and
      iv) carrying out inter-symbol interference cancellation on said revised intermediate signal using said revised second transmission channel estimate to provide said revised output signal.

2. The method according to claim 1, wherein said step of carrying out co-channel interference comprises beamforming said input signal.

3. The method according to claim 2, wherein said beamforming comprises applying adaptive weights to said input signal.

4. The method according to claim 3, wherein said adaptive weights are determined based upon a comparison between said intermediate signal and a reference signal generated from said first estimate of said transmission channel and said predetermined training sequence.

5. The method according to claim 1, further comprising:
   g) carrying out inter-system interference cancellation on said input signals prior to said co-channel interference cancellation, said inter-system interference cancellation being based upon said first estimate of said transmission channel.

6. The method according to claim 1, wherein said output signal is processed to provide reference estimate data, and wherein said reference estimate data is used in one or more of steps d), iii), and e).

7. The method according to claim 5, wherein:
   said output signal is processed to provide reference estimate data, and
   said reference estimate data is used in one or more of steps d), iii), e) and g).

8. The method according to claim 6, wherein said reference estimate data is obtained by deinterleaving and then decoding said output signal followed by reinterleaving.

9. A receiver adapted to operate according to the method of any one of the preceding claims.

10. The method according to claim 1, comprising:
    repeating step f) to obtain the revised first transmission channel estimate and the revised second transmission channel estimate; post-filtering said intermediate signal prior to carrying out inter-symbol interference;
    optimizing said post-filtering step based upon the revised first transmission channel estimate and the revised second transmission channel estimate; and
    outputting the revised first transmission channel estimate and the revised second transmission channel estimate to a transmitter, wherein
    steps a) through f) are carried out in the transmitter using the revised first transmission channel estimate and the revised second transmission channel estimate.

11. A computer program stored in a computer readable medium and including computer executable instructions that cause a processor to implement the method of any one of claims 1 to 8.

12. A computer readable medium including computer executable instructions that cause a processor to implement the method of any one of claims 1 to 8.

13. A receiver for optimizing an estimate of a transmission channel over which signals based upon a predetermined training sequence are being transmitted to said receiver, the receiver comprising:
    a training sequence generator configured to generate a training sequence;
    a plurality of antennas configured to produce input signals based upon said signals transmitted to said receiver;
    a first transmission channel estimator configured to generate a first transmission channel estimate based upon said input signals and said predetermined training sequence;
    a co-channel interference canceller configured to cancel co-channel interference in said input signals and using said first transmission channel estimate to provide an intermediate signal;
    a second transmission channel estimator configured to generate a second transmission channel estimate based upon said intermediate signal and said predetermined training sequence and further configured to selectively generate a revised second transmission channel estimate based upon said intermediate signal, said predetermined training sequence and a previously calculated second transmission channel estimate; and
    an inter-symbol interference canceller configured to cancel inter-symbol interference in said intermediate signal using said second transmission channel estimate to provide an output signal, wherein
    said second transmission channel estimator configured to feed back said second transmission channel estimate to said first transmission channel estimator, and said first transmission channel estimator is configured to selectively use said second transmission channel estimate along with said input signals and said predetermined training sequence for generating a revised first transmission channel estimate.

14. The receiver according to claim 13, wherein said co-channel interference canceller includes a beamformer configured to beamform said input signals.

15. The receiver according to claim 14, wherein said beamformer comprises adaptive weighters configured to apply variable weights to paths through the beamformer.

16. The receiver according to claim 15, further comprising:
a weight controller, and configured to adjust said weights based upon a comparison of the output from the beamformer and a reference output based upon the first transmission channel estimate and said predetermined training sequence.

17. The receiver according to claim 13, further comprising:
an inter-system interference canceller configured to carry out inter-system interference cancellation on said input signals and outputting the inter-system interference cancelled input signals to said co-channel interference canceller, said inter-system interference cancellation being based upon said first transmission channel estimate.

18. The receiver according to claim 13, further comprising:
an output processor configured to deinterleave and decode said output signal to provide reference estimate data; and
an interleaver configured to reinterleave said reference estimate data for use in at least one of said second transmission channel estimator and said inter-symbol interference canceller.

19. The receiver according to claim 17, further comprising:
an output processor configured to deinterleave and decode said output signal to provide reference estimate data; and
an interleaver configured to reinterleave said reference estimate data for use in at least one of said second transmission channel estimator, said inter-symbol interference canceller and said inter-system interference canceller.

* * * * *